No. 739,235. Patented September 15, 1903.

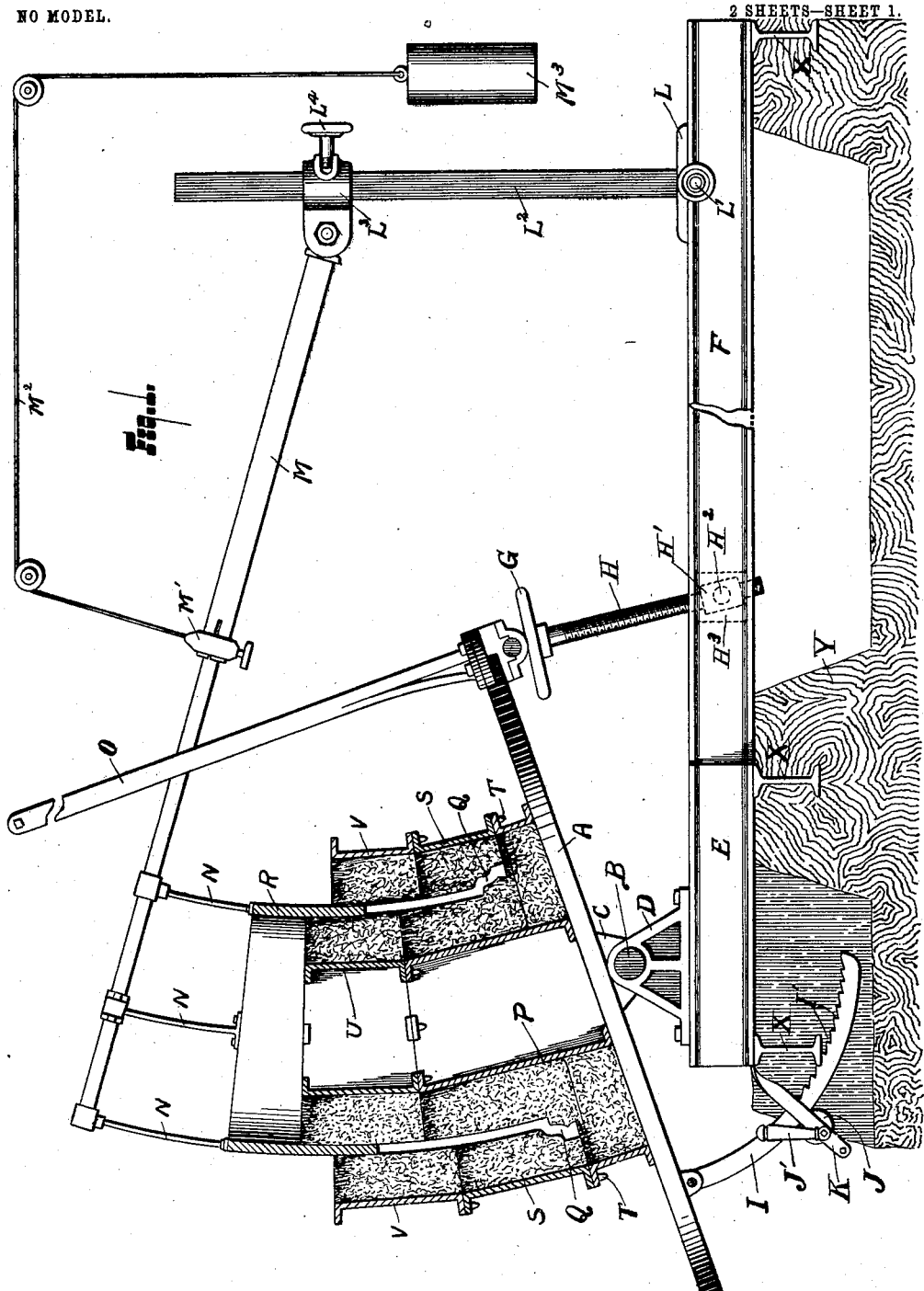

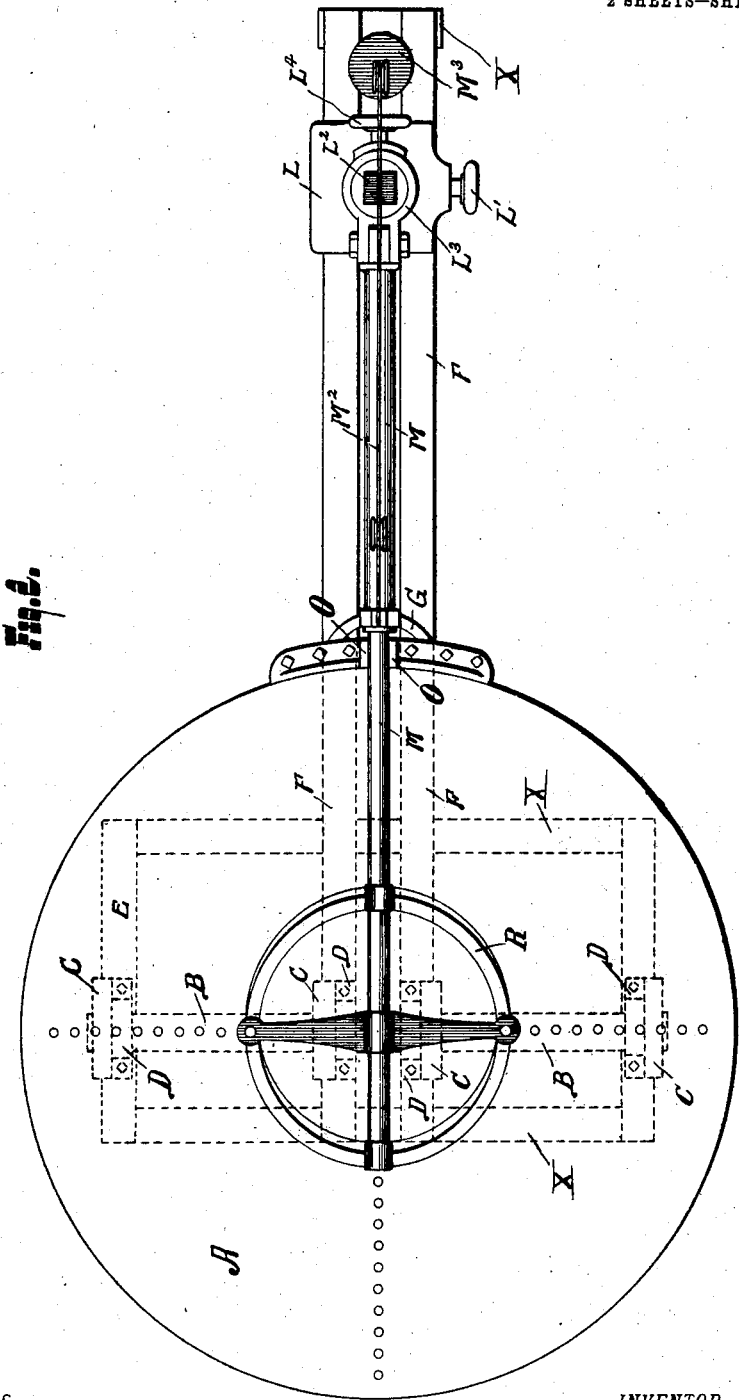

UNITED STATES PATENT OFFICE.

WALTER E. STUART, OF DETROIT, MICHIGAN.

MOLDING APPARATUS.

SPECIFICATION forming part of Letters Patent No. 739,235, dated September 15, 1903.

Application filed August 11, 1902. Serial No. 119,351. (No model.)

*To all whom it may concern:*

Be it known that I, WALTER E. STUART, a citizen of the United States, residing at Detroit, in the county of Wayne and State of Michigan, have invented certain new and useful Improvements in Molding Apparatus; and I do hereby declare the following to be a full, clear, and exact description of the invention, such as will enable others skilled in the art to which it appertains to make and use the same.

My invention relates to improvements in molding apparatus to be employed in building up molds in which large castings may be accurately and cheaply made, and in disclosing the invention I have illustrated such an apparatus especially designed for use in connection with a mold in which are cast large curved sections of pipe.

Various methods have been employed and many attempts have been made to cast large curved pipe-sections; but of these attempts the greater proportion have been complete failures, the results being entirely unreliable and problematical. Such conditions naturally materially increase the cost of producing such castings, and, in fact, in many instances further attempts to secure a good casting have been completely abandoned, occasioning considerable loss in time and otherwise upon all concerned.

It is one of the objects of my invention to eliminate the element of uncertainty in making such castings by the use of an apparatus whereby a mold for a pipe-bend of any desired curvature may be quickly and accurately made and which mold in casting will produce a perfect casting with certainty, thereby materially decreasing the time and cost in producing such a casting, but also increasing the possibilities in making castings that have been heretofore found impossible.

Other features of novelty will hereinafter more fully appear, and in order that my said invention may be more fully understood reference will be had to the accompanying drawings, wherein—

Figure 1 is an elevation, partly in section, showing my invention embodied in an apparatus for use in molding curved pipe; and Fig. 2 is a plan view of the same.

In the drawings the same letters of reference are employed in designating similar parts.

A is a tilting table, preferably circular, having spaced supporting-lugs C C, through which passes the pivot-pin B. This pivot-pin B also passes through the standards D D in proximity to the lugs C C upon the bottom of the table. These standards are bolted securely upon the top of the spaced parallel beams F F and upon the supplemental rectangular frame E. These frames E and F are suitably supported upon a suitable foundation, such as by the cross-beams X, embedded in the foundation Y.

Beneath one end of the table A rests the hand-wheel G, carried by the screw H. Between the spaced beams F F is located the internally-screw-threaded block H', provided with trunnions $H^2$, resting in bearings in the bearing-blocks $H^3$, suitably supported between the spaced beams F F. The screw H enters the screw-threads in this block, and by rotating the hand-wheel G, carried thereby, in the proper direction the table may be tilted at the desired angle.

Attached to the under side of the table A opposite to the screw H is a segment I, provided with ratchet-teeth or notches I', adapted to engage upon the under side of the I-beam X. This segment passes through the guides K, preferably supported from the frame X, and between these guides K is rotatably mounted an eccentric J, adapted to bear against the under side of the segment I and which when rotated by the handle J' will press the teeth I' up into engagement with the beam X, preventing movement of the table A.

L is a carriage adapted to slide longitudinally along the spaced beams F F and provided with a set-screw L', by means of which said carriage may be secured at any desired position upon said beams. Extending vertically from the carriage L is a standard $L^2$, preferably square in cross-section, upon which is slidingly mounted the bracket $L^3$, provided with a set-screw $L^4$, adapted to secure said bracket at any desired elevation upon the standard $L^2$. Pivotally mounted upon the bracket L³ is a swinging radius-arm M, preferably formed of two sections telescoping one within the other and secured by the clamp M'.

M² is a cord attached to the swinging arm M, passing over suitable pulleys and carrying a counterweight M³ upon its free end for counterbalancing the arm M. Upon the free end of this pivoted arm M is carried a framework N, to which is attached the pattern R. This pattern R, as shown in the drawings, is cylindrical in form and has its longitudinal surface curved to the desired curvature of the pipe-section to be molded; but it will be manifest that where a mold is to be formed simply for a longitudinally-curved plate not cylindrical in shape the pattern R will be formed correspondingly.

To steady the swinging radius-arm M, a pair of spaced members O, forming guides, is preferably bolted to the table A and embraces the arm M to prevent lateral motion between the molds upon the table and the pattern upon the swinging arm M.

In forming a mold for casting a curved section of pipe a two-part flask P of substantially the shape shown is first placed upon the table A after the same has been tilted at the proper angle. Sand or loam is now poured into the flask and packed, partially filling the same. A divided pattern of the flange or union Q of the pipe is now placed in the flask. The short section of pattern R, having a curvature equal to the desired curvature of pipe, is properly secured upon the frame N, the telescoping radius-arm adjusted to a length equal to the radius of the circle from which the curve of the pattern R was struck, and the upright or standard L² is moved along the beams F F until the pattern R when lowered will fit upon the flange-pattern Q, after which the set-screw L' is tightened. With the curved section of pattern R resting upon the flange-pattern Q the flask S is placed upon the top of the outer section of the two-part flask P and held in place by the pins T. The space between the flasks P and S is then filled with sand or loam and properly rammed, when the sand or loam is smoothed off at the top. The flasks U and V are now placed upon the top of the inner section of the flask P and the flask S, respectively, and the space therebetween filled with sand or loam and properly tamped or rammed. As the flasks are added the pattern-section R is raised by the radius-arm M, said pattern traveling in the arc of a circle coincident with the curvature of the pipe-section to be cast. In this way flasks are added and the pattern R raised until a mold is provided adapted to produce a pipe-section of the required length. The flasks may now be taken apart, the flange-pattern removed and placed in an oven, where they are separately baked, and when this operation is completed the mold is again assembled in a pit and is ready for casting.

From the foregoing it will be seen that an apparatus is provided whereby the construction of a mold wherein may be successfully cast curved pipe-sections is very much facilitated, reducing the time ordinarily consumed in setting up such a mold and consequent reduction in cost, as well as insuring the production of a perfect casting from each mold thus constructed. It will also be observed that all objectionable features incident upon the employment of a core are eliminated.

Other features of novelty and advantage will be readily apparent to any one skilled in the art, and while I have illustrated and described my said invention as embodied in an apparatus for molding curved sections of pipe it will be understood that the same may be employed in various other connections, and in so adapting my said invention various changes and modifications might suggest themselves, which changes and modifications could be made without departing from the spirit of my said invention.

Having thus described my invention, what I claim, and desire to secure by Letters Patent of the United States, is—

1. In an apparatus for forming molds, the combination with a mold-supporting table, of a sectional arm longitudinally adjustable and pivotally supported at one end adjacent said table, a pattern carried on the free end of said adjustable arm above said table, and means for swinging said arm in a vertical plane.

2. In an apparatus for forming molds, the combination with a mold-supporting table, a longitudinally-telescoping arm pivotally supported at one end adjacent said table, a pattern carried on the free end of said telescoping arm above said table, and means for swinging said arm in a vertical plane.

3. In an apparatus for forming molds, the combination with a mold-supporting table, of a longitudinally-adjustable arm pivotally supported at one end adjacent said table and vertically adjustable at said pivoted end, a pattern carried on the free end of said arm above said table, and means for swinging said arm in a vertical plane.

4. In an apparatus for forming molds, the combination with a mold-supporting table, of a movable support adjacent said table, a longitudinally and vertically adjustable arm pivotally supported at one end on said movable support, a pattern carried on the free end of said arm above said table, means for swinging said arm in a vertical plane, and means for locking said movable support in any desired position relatively to said table.

5. In an apparatus for forming molds, the combination with a mold-supporting table, of an upright, a sectional arm longitudinally adjustable and pivotally supported on said upright, a pattern carried on the free end of said adjustable arm above said table, and means for swinging said arm in a vertical plane.

6. In an apparatus for forming molds, the combination with a mold-supporting table, of an upright, a longitudinally-adjustable arm pivotally supported at one end on said upright and vertically adjustable at said pivoted end, a pattern carried on the free end of said arm above said table, and means for swinging said arm in a vertical plane.

7. In an apparatus for forming molds, the combination with a mold-supporting table, of an upright movable relative to said table provided with means for securing same in the desired position, a longitudinally-adjustable arm pivotally supported on said upright, a pattern carried on the free end of said adjustable arm above said table, and means for swinging said adjustable arm in a vertical plane.

8. In an apparatus for forming molds, the combination with a support for the mold, of a second support movable relatively to said mold-support and provided with means for securing same in the desired position, an arm pivotally secured at one end to said movable support and vertically adjustable at said pivoted end, a longitudinally-curved pattern carried on the free end of said adjustable arm above said mold-support, and means for swinging said adjustable arm in a vertical plane.

9. In an apparatus for forming molds, the combination with a mold-supporting table, of an upright movable relative to said table provided with means for securing it in the desired position, a longitudinally and vertically adjustable arm pivotally supported on said movable upright, a pattern carried on the free end of said adjustable arm above said table, and means for swinging said adjustable arm in a vertical plane.

10. An apparatus for forming longitudinally-curved molds, consisting of means for simultaneously building up the concave and convex surfaces of the mold in a series of steps, comprising removable inner and outer flask members adapted to receive the packing material, a movable longitudinally-curved pattern coöperating with the packing material, and means for operating said pattern step by step through the packing material for withdrawing said pattern as each section of the mold is formed.

11. Apparatus for forming molds for curved pipes by simultaneously building up in a series of steps the outer mold member and the core, comprising removable inner and outer flask members adapted to receive the packing material, a movable longitudinally-curved hollow pattern, cylindrical in cross-section, adapted to coöperate with the packing material in the formation of the mold, and means for operating said pattern step by step through the packing material for withdrawing said pattern as each section of the mold is formed.

12. In an apparatus for forming longitudinally-curved molds, the combination with suitable packing-flasks adapted to receive the packing material, of a longitudinally-curved pattern adapted to be supported within said flasks and coöperate with the packing material for simultaneously building up the concave and convex mold-surface, and means for operating said curved pattern step by step through the packing material in an arc coincident with the arc of curvature of the pattern for withdrawing said pattern as each section of the mold is formed and forming a mold of predetermined longitudinal curvature.

13. In an apparatus for simultaneously building up, in a series of steps, the outer mold member and the core for curved molds, the combination with a mold-supporting table, of an arm pivotally supported adjacent said table, a longitudinally-curved pattern carried on the free end of said arm above said table, and means coöperating with said arm for swinging said curved pattern in an arc coincident with its arc of curvature for withdrawing said pattern from the packing medium as each section of the mold is formed.

14. In an apparatus for simultaneously building up in a series of steps, the outer mold member and the core for curved molds, the combination with a mold-supporting table, of a longitudinally and vertically adjusted radius-arm pivotally supported adjacent said table, a longitudinally-curved pattern carried on the free end of said arm above said table, and coöperating means for swinging said curved pattern in an arc coincident with its arc of curvature for withdrawing said pattern from the packing medium as each section of the mold is formed.

15. In an apparatus for simultaneously building up in a series of steps, the outer mold member and the core for curved pipe-molds, the combination with a support for the mold, of an arm pivotally supported at one end adjacent said mold-support, means for adjusting said arm longitudinally of said mold-support, and a cylindrical longitudinally-curved pattern adapted to be carried on the free end of said arm above said mold-support, said parts adapted to coöperate together for swinging said curved pattern in an arc coincident with its arc of curvature for withdrawing said pattern from the packing medium as each section of the mold is formed.

16. In an apparatus for simultaneously building up in a series of steps, the outer mold member and the core for curved molds, the combination with a pivoted mold-supporting table and means for adjusting the inclination thereof, of an upright, of removable inner and outer flask members carried by said table and adapted to receive the packing material, a longitudinally-adjustable arm pivoted to said upright, and a hollow cylindrical longitudinally-curved pattern carried on the free end of said adjustable arm above said table, said parts coöperating together for swinging said curved pattern step by step through said flasks and packing material in an arc coincident with its arc of curvature for withdrawing said pattern from the packing material as each section of the mold is formed.

17. In an apparatus for simultaneously building up in a series of steps, the outer mold member and the core for curved molds, the combination with a pivoted mold-supporting table and means for adjusting the inclination thereof, of an upright, a longitudinally and vertically adjustable arm pivotally supported on said upright, a hollow cylindrical longitudinally-curved pattern carried on the free end of said swinging arm above said table, and means for moving said arm in a vertical plane, said parts coöperating together for swinging said curved pattern in an arc coincident with its arc of curvature for withdrawing said pattern from the packing medium as each section of the mold is formed.

18. In an apparatus for forming curved molds, the combination with a pivoted mold-supporting table and means for adjusting the inclination thereof, of an upright movable relative to said table provided with means for securing same in the desired position, a longitudinally-adjustable arm pivotally supported on said upright, a hollow cylindrical longitudinally-curved pattern carried on the free end of said adjustable arm above said table, and means for swinging said arm in a vertical plane.

19. In an apparatus for forming curved molds, the combination with a pivoted mold-supporting table and means for adjusting the inclination thereof, of an upright movable relative to said table provided with means for securing it in the desired position, a longitudinally and vertically adjustable arm pivotally supported on said movable upright, and a hollow cylindrical longitudinally-curved pattern carried on the free end of said adjustable arm above said table, and means for swinging said arm in a vertical plane.

In testimony whereof I affix my signature in presence of two witnesses.

WALTER E. STUART.

Witnesses:
H. H. HAGER,
RAY B. MORGAN.